United States Patent
Bjorn et al.

(10) Patent No.: US 7,698,565 B1
(45) Date of Patent: Apr. 13, 2010

(54) CRYPTO-PROXY SERVER AND METHOD OF USING THE SAME

(75) Inventors: Vance C. Bjorn, San Carlos, CA (US); Daniel Lopez, Miami, FL (US)

(73) Assignee: DigitalPersona, Inc., Redwood City, CA (US)

(*) Notice: Subject to any disclaimer, the term of this patent is extended or adjusted under 35 U.S.C. 154(b) by 0 days.

(21) Appl. No.: 09/538,926

(22) Filed: Mar. 30, 2000

(51) Int. Cl.
*H04L 9/00* (2006.01)
*H04L 9/32* (2006.01)
*G06K 9/00* (2006.01)

(52) U.S. Cl. .......... 713/186; 713/156; 713/175; 726/5; 726/10; 382/115

(58) Field of Classification Search .......... 713/186, 713/200; 380/282
See application file for complete search history.

(56) References Cited

U.S. PATENT DOCUMENTS

| | | | |
|---|---|---|---|
| 5,534,855 A * | 7/1996 | Shockley et al. .......... 340/825.3 |
| 5,535,276 A * | 7/1996 | Ganesan .................. 713/155 |
| 5,692,106 A | 11/1997 | Towers et al. |
| 5,748,735 A | 5/1998 | Ganesan |
| 5,825,884 A | 10/1998 | Zdepski et al. |
| 5,838,792 A | 11/1998 | Ganesan |
| 5,867,578 A * | 2/1999 | Brickell et al. .......... 380/23 |
| 5,930,804 A * | 7/1999 | Yu et al. ............... 707/104 |
| 6,006,334 A | 12/1999 | Nguyen et al. |
| 6,012,039 A * | 1/2000 | Hoffman et al. .......... 705/14 |
| 6,016,476 A * | 1/2000 | Maes et al. ............. 705/1 |
| 6,105,010 A * | 8/2000 | Musgrave .............. 705/44 |
| 6,119,227 A | 9/2000 | Mao |
| 6,151,676 A | 11/2000 | Cuccia et al. |
| 6,167,518 A | 12/2000 | Padgett et al. |
| 6,202,151 B1 * | 3/2001 | Musgrave et al. .......... 713/186 |
| 6,213,391 B1 | 4/2001 | Lewis |
| 6,233,685 B1 | 5/2001 | Smith et al. |
| 6,256,737 B1 | 7/2001 | Bianco et al. |

(Continued)

FOREIGN PATENT DOCUMENTS

EP 001265121 A2 * 11/2002

(Continued)

OTHER PUBLICATIONS

Laili et al, Secured Network Authentication Using Biometrics Application, 2002, IEEE, pp. 368-370.*

(Continued)

*Primary Examiner*—Aravind K Moorthy
(74) *Attorney, Agent, or Firm*—Blakely, Sokoloff, Taylor & Zafman, LLP; Judith A. Szepesi

(57) ABSTRACT

A method of providing a certificate from a client to a server is disclosed. The method comprises receiving a request for a certificate from the server and forwarding the request to a biometric certification server (BCS). The method further includes receiving a biometric identification from the client and forwarding the biometric identification to the BCS. If the biometric identification matches a registered user on the BCS, receiving a certificate including a public key of the client certified by the BCS, and forwarding the certificate to the server, thereby identifying the client to the server.

26 Claims, 11 Drawing Sheets

U.S. PATENT DOCUMENTS

| | | |
|---|---|---|
| 6,263,438 B1 | 7/2001 | Walker et al. |
| 6,310,966 B1 * | 10/2001 | Dulude et al. ............... 382/115 |
| 6,321,339 B1 | 11/2001 | French et al. |
| 6,434,561 B1 | 8/2002 | Durst, Jr. et al. |
| 6,507,912 B1 * | 1/2003 | Matyas, Jr. et al. .......... 713/200 |
| 6,553,494 B1 * | 4/2003 | Glass ........................ 713/186 |
| 6,581,161 B1 | 6/2003 | Byford |
| 6,587,946 B1 * | 7/2003 | Jakobsson ................... 713/180 |
| 6,594,376 B2 | 7/2003 | Hoffman et al. |
| 6,609,198 B1 | 8/2003 | Wood et al. |
| 6,636,975 B1 * | 10/2003 | Khidekel et al. ............ 713/202 |
| 6,668,322 B1 | 12/2003 | Wood et al. |
| 6,691,232 B1 | 2/2004 | Wood et al. |
| 6,697,947 B1 * | 2/2004 | Matyas et al. ............... 713/182 |
| 6,853,988 B1 | 2/2005 | Dickinson et al. |
| 7,085,931 B1 * | 8/2006 | Smith et al. ................. 713/182 |
| 7,107,447 B2 | 9/2006 | Sanin et al. |
| 7,111,172 B1 * | 9/2006 | Duane et al. ................ 713/182 |
| 2001/0034836 A1 * | 10/2001 | Matsumoto et al. ......... 713/176 |
| 2001/0050990 A1 * | 12/2001 | Sudia ........................ 380/286 |
| 2002/0002678 A1 * | 1/2002 | Chow et al. ................. 713/169 |
| 2002/0049681 A1 | 4/2002 | Herreweghen |
| 2002/0107804 A1 | 8/2002 | Kravitz |
| 2003/0172090 A1 | 9/2003 | Asunmaa et al. |
| 2003/0190046 A1 | 10/2003 | Kamerman et al. |

FOREIGN PATENT DOCUMENTS

| | | |
|---|---|---|
| EP | 001768304 A1 | 3/2007 |
| JP | 09-081519 | 3/1977 |
| JP | S52-67501 | 6/1977 |
| JP | 09-120293 | 5/1997 |
| JP | 224236 | 8/1999 |
| WO | WO 98/26385 | 6/1998 |
| WO | WO 98/50875 | 11/1998 |
| WO | WO 99/26188 | 5/1999 |
| WO | WO 2005057384 A1 * | 6/2005 |
| WO | WO 2006000990 A2 | 1/2006 |

OTHER PUBLICATIONS

Rosch, Winn, Passport Security to go high-tech A chip will store your physical characterisitcs, Aug. 2003, The Plain Dealer, pp. 1-3.*

Poh, Norman, et al., "A Multi-Sample Multi-Source Model for Biometric Authentication," 2002, IEEE, pp. 375-384.

Kelly, John, State-of-the-Art: Tech's Moving Target, Oct. 2003, GlobeSt.com, p. 1.

* cited by examiner

CRYPTO-PROXY SERVER AND METHOD OF USING THE SAME

FIELD OF THE INVENTION

The present invention relates to client-server technology, and more specifically, to biometric authentication using a server.

BACKGROUND

As more and more information is moving into electronic form, encryption is becoming more common. One prior art method of encryption is public key encryption—an encryption scheme in which each person gets a pair of keys, called the public key and the private key. Each person's public key is published while the private key is kept secret. Messages are encrypted using the intended recipient's public key and can only be decrypted using the recipient's private key. Messages are signed using the sender's public key and can only be decrypted using the sender's public key. The need for sender and receiver to share secret information (keys) via some secure channel is eliminated—all communications involve only public keys, and no private key needs to be transmitted or shared. Public-key cryptography can be used for authentication (digital signatures) as well as for privacy (encryption). Other encryption schemes, such as symmetric key encryption rely on an exchange of keys.

FIG. 1 is a diagram of a prior art network. The client 110 connects to a server 130 through network 140. A certification authority 150 provides a private/public key pair for the user. The certification authority 150 further provides certificate 115 to the client. The certificate 115 is a copy of the user's public key, signed by the certification authority 150, to prove its authenticity. The certificate 115 and the user's private key 120 are stored on the client system 110. Private keys generally are 64 bit numbers or larger and users do not memorize their keys. Because computer systems are rarely truly secure, the key may be taken from a computer system. In order to prevent this, the key may be stored in a password protected file. However, passwords may be broken. Additionally, the system is only as secure as the least secure level. For one embodiment, the user types in the password 125, to release the private key 120, so the user can use the private key.

Client II 160 illustrates the same user roaming, i.e. on a different computer system, connecting to a server 130 through the network 140. Client II 160 does not have the user's private key or certificate. Therefore, the user has to carry a smart card or diskette 170 on which the user's certificate and private key are stored. Again, the certificate and private key may be protected by a password. However, smart cards can be lost, and require a user to remember to carry something.

Furthermore, generally the keys are stored on a computer system, and are thus connected to the computer system, rather than an actual user. In the prior art, a user could pass to an impostor his or her password, accidentally or on purpose, and that impostor could then "prove" that he or she was the user.

Furthermore, because each user's private key is stored on his or her computer system, administering the keys is difficult.

In addition, a single mistake, i.e. accidentally granting access to an unauthorized user, permanently breaches the security of the private-public key pair, since the private key is revealed.

SUMMARY OF THE INVENTION

A method of providing a certificate from a client to a server is disclosed. The method comprises receiving a request for a certificate from the server and forwarding the request to a biometric certification server (BCS). The method further includes receiving a biometric identification from the client and forwarding the biometric identification to the BCS. If the biometric identification matches a registered user on the BCS, receiving a certificate including a public key of the client certified by the BCS, and forwarding the certificate to the server, thereby identifying the client to the server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A crypto-server system is described. Server-side crypto-proxying is a form of PKI where a user's private key is stored on a central server, and never released, even to the user. When a user needs his or her private key to perform an operation (encryption, signing, identification), the user's client machine creates a secure connection to the crypto-server, authenticates the user to the crypto-server, and sends the data to be encrypted/signed to the crypto-server. After the crypto-server successfully authenticates the user, the crypto-server performs the encryption/signature operation requested, and sends the resulting data back to the client machine. This permits the user to roam between machines, and prevents the user from accidentally revealing his or her key to others. Furthermore, this makes key management and administration easy, and permits time-stamping and key archiving/retiring. All of these features make the crypto-server an excellent tool.

Figure 1:
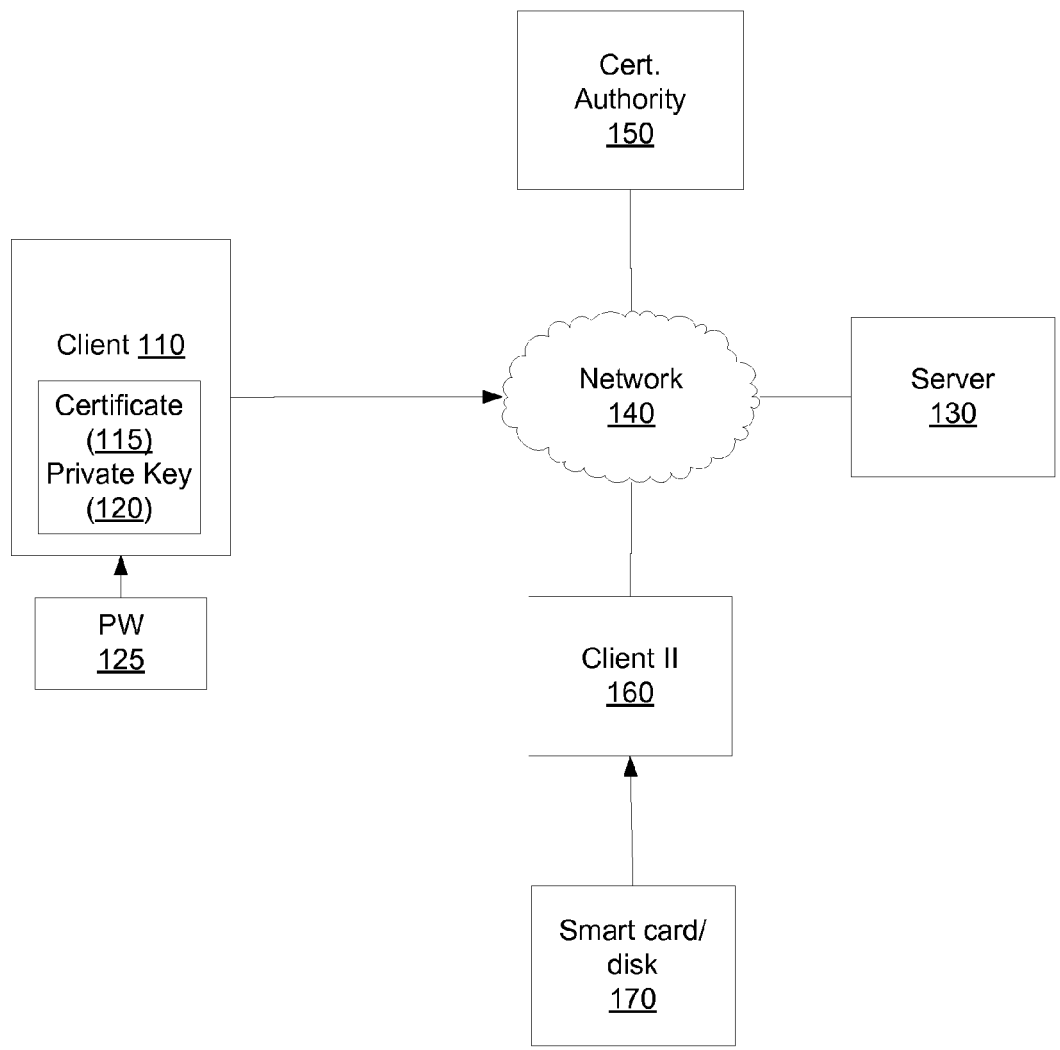
FIG. 1 is a diagram of a prior art network.
Figure 2:
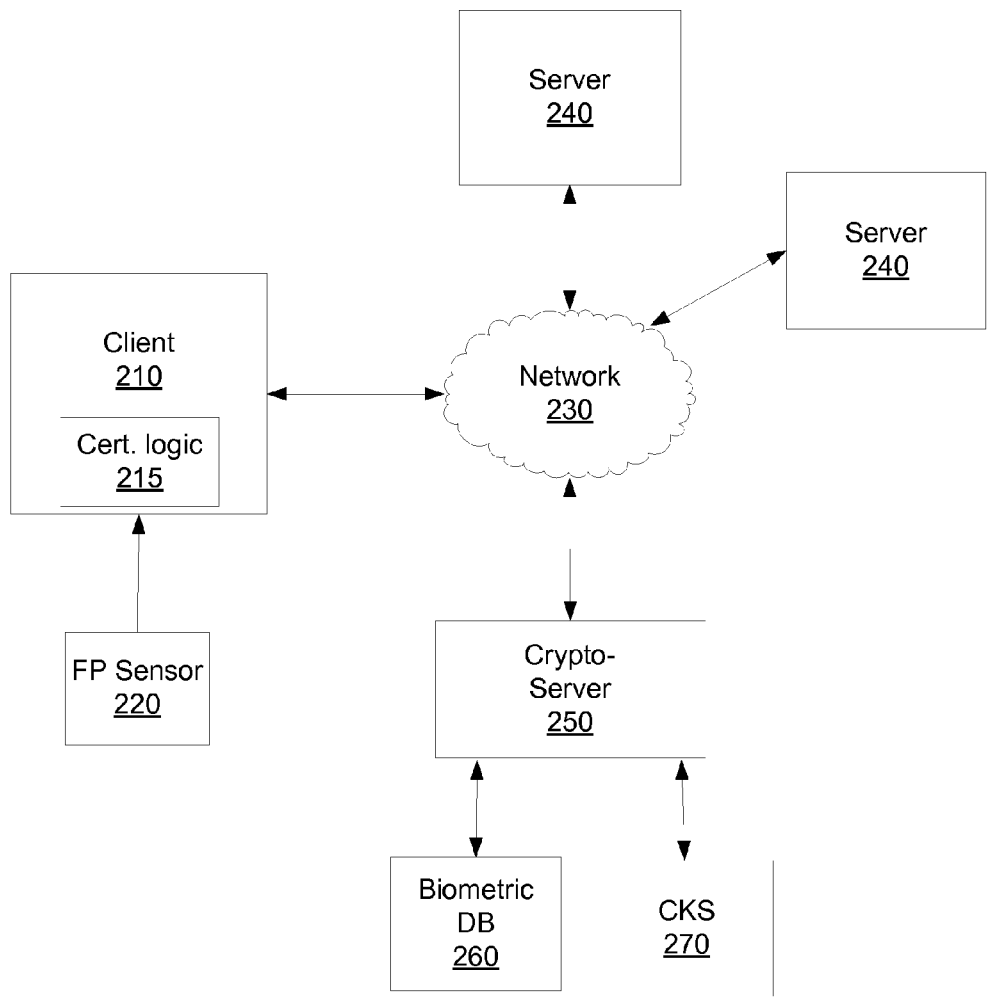
FIG. 2 is a block diagram of one embodiment of a network including crypto-proxying system.

FIG. 2 is a block diagram of one embodiment of a network including crypto-proxying system. A client 210 is connected to a server 240 through a network 230. If the client 210 wants to perform an operation that requires the user's private or public key, i.e. identification/encryption/signature, the client's certification logic 215 is invoked. The certification logic 215 contacts the crypto-server 250. The crypto-server 250 includes a biometric database 260. The crypto-server 250 requests biometric identification from the client 210. The client system 210 includes a biometric sensor 220. When the user places his or her fingerprint, or other biometric area over the sensor 220, the information is sent to the crypto-server 250. The crypto-server 250 then determines whether the user is a known user. If the user is a known user, the crypto-server 250 provides the requested crypto-data, either from the CKS database 270, or by generating a one-time key pair, as will be described below.

For one embodiment, the network may be the Internet. Alternatively, the network 230 may be a local area network (LAN), wide area network (WAN), or another type of network. For one embodiment, the crypto-server 250 may be located within the LAN, WAN, or corporation. Thus, a company may install its own crypto-server 250, to simplify internal key management.

For another embodiment, the client 210 and crypto-server 250 may be on the same computer system. The client 210 may invoke the crypto-server 250 when logging on to another server, when writing e-mail, or for another reason when crypto-data is needed.

Figure 3:
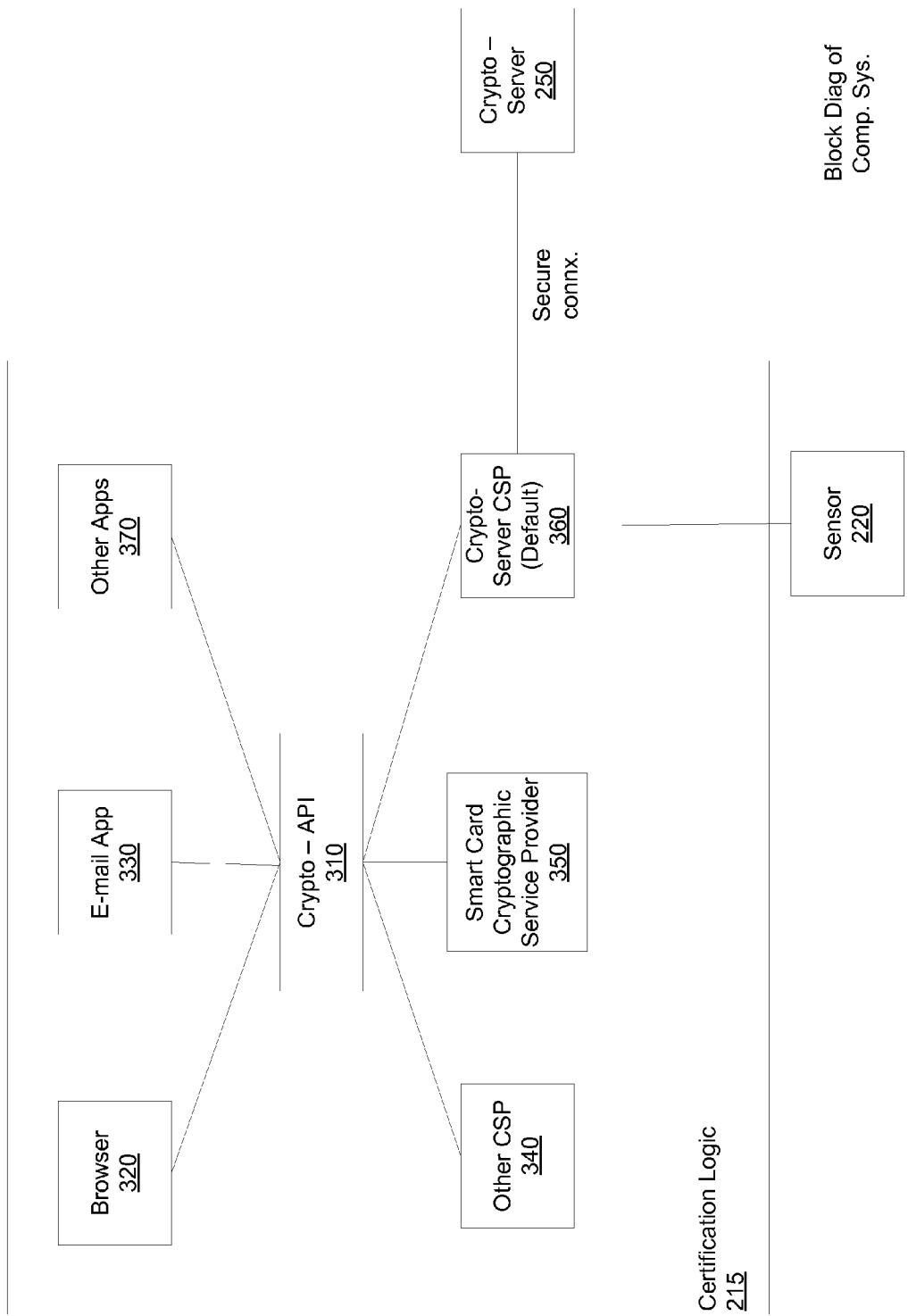
FIG. 3 is a block diagram of one embodiment of a client system enabled to use crypto-proxying.

FIG. 3 is a block diagram of one embodiment of a client system enabled to use crypto-proxying. The certification logic 215 in the client system includes a crypto-API (application user interface) 310.

For one embodiment, the crypto-API 310 is the crypto-API 310 offered by Microsoft in Microsoft Windows environments.

The crypto-API 310 provides a flexible means of developing cryptography applications. All communication with a cryptographic service provider (CSP) occurs through these functions provided by the crypto-API 310. Each CSP 340, 350, 360 is an independent module that performs all cryptographic operations. At least one CSP 340, 350, 360 is used with each application that uses cryptographic functions. If more than one CSP is in the system, the one to use can be specified in the Crypto-API 310 cryptographic function calls. For one embodiment, the certification logic 215 may set the default CSP to the Crypto-Server CSP 360. In this way, whenever cryptographic services are called for, unless another CSP is specified, the crypto-server CSP 360 is invoked.

The crypto-API 310 may link to other CSPs 340, to a CSP supporting smart cards 350. However, for one embodiment, the crypto-server CSP 360 is made the default CSP.

The crypto-API 310 is invoked whenever an application, such as a browser 320, e-mail application 330, or other application 370 invokes a cryptographic service. For example, the crypto-API 310 may be invoked by the user signing a document being created with his or her private key, by a user identification needed by a server accessed through browser 320, by using the user's private key to decrypt an encrypted email received through e-mail application 330. Other uses of cryptographic processes in the computer system of the present invention may also invoke the crypto-API 310.

The crypto-API 310 invokes the default CSP 360, unless the application invoking the crypto-API 310 specifies another CSP. When the crypto-server CSP 360 is invoked, a secure connection is established with the crypto-server 250. The crypto-server 250 requests biometric identification of the user. For one embodiment, the sensor 220 may be coupled to the system, and through it to the crypto-server CSP 360. The user's biometric data is then sent, in some format, to the crypto-server 250. The crypto-server 250 performs the cryptographic functions requested by an application. The system on which the user resides never receives the user's private key. In this way, by invoking the crypto-server CSP 360 through the crypto-API 310, cryptographic services can be provided to a user without disclosing, even to the user, the private key data.

For another embodiment, in another system, the crypto-server hook may be inserted into the system in some other way. Generally, the crypto-server hook is invoked whenever a cryptographic service is accessed by a user. In this way, the user can perform cryptographic functions, while maintaining the security of the user's private key data.

Figure 4:
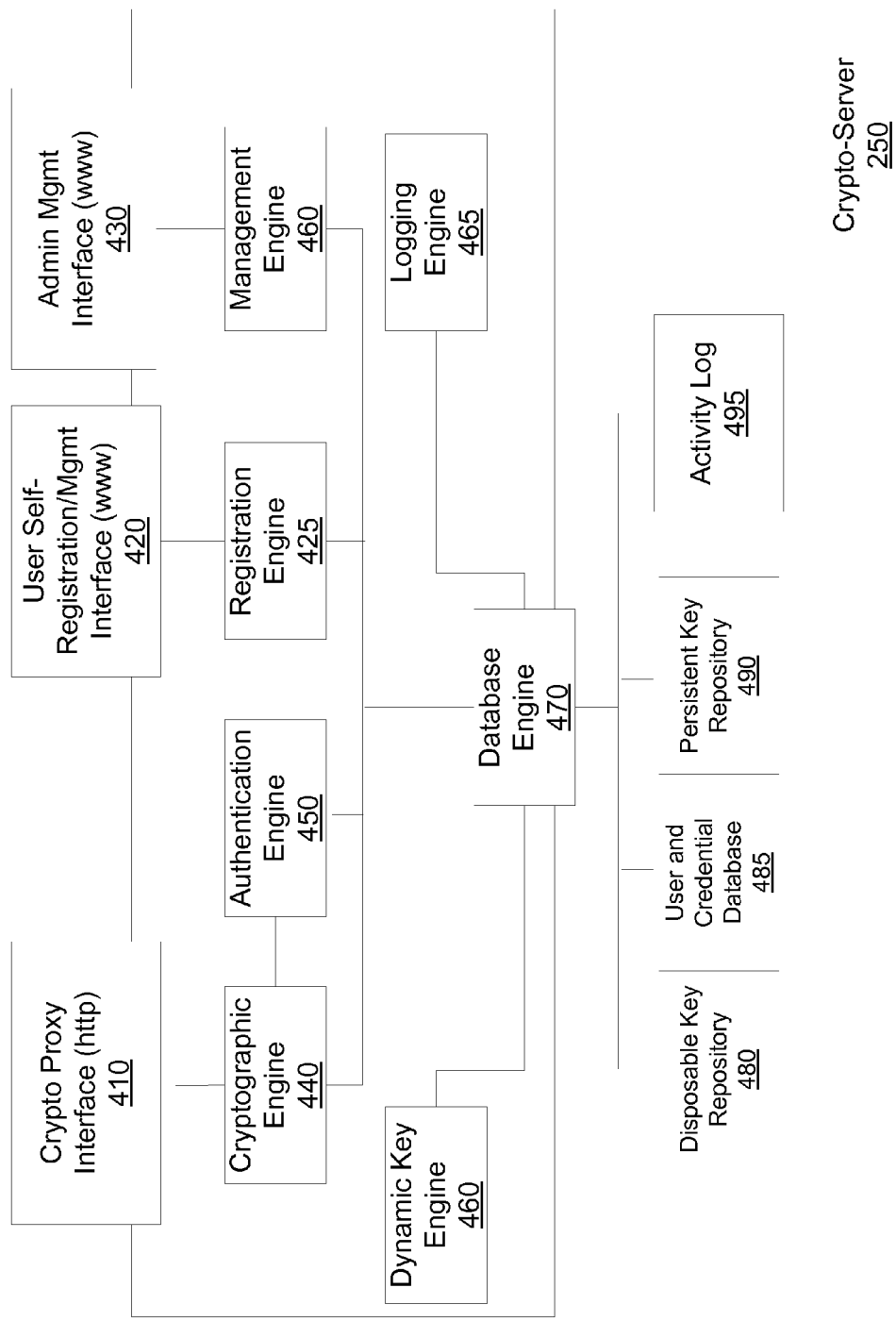
FIG. 4 is a block diagram of one embodiment of a crypto-proxying server.

FIG. 4 is a block diagram of one embodiment of a crypto-server. The crypto-server 250 includes a user self-registration/management interface 420 to permit a user to register and to administer his or her account. The user interface 420 is coupled to the registration engine 425, which permits the user to register, as well as add or delete biometric information and otherwise alter his or her account. The registration engine 425 is coupled to the database engine 470, which stores the data received from the user in the appropriate databases. The registration process is described in more detail below with respect to FIG. 5.

The crypto-server 250 further includes an administration management interface 430. The administration interface 430 is coupled to the management engine, which permits an administration access to the crypto-server 250. For one embodiment, administration interface 430 can only be accessed from specific computers. For one embodiment, the administrative functions do not permit the administrator to access the keys or biometric information stored in the databases. Thus, the administrator, can not alter a user's account.

The crypto-server 250 includes a crypto-proxy interface 410. The crypto-proxy interface 410 is used by the crypto-server hook in the user's system, to invoke the services of the crypto-server 250. The crypto-proxy interface 410 is coupled to a cryptographic engine 440. The cryptographic engine 440 performs the cryptographic services requested by the user. The cryptographic engine 440 uses the user's private/public keys from the persistent key repository 490 to sign documents and/or decrypt documents. The cryptographic engine 440 further may use the dynamic key engine 460 to generate a dynamic key pair, temporarily stored in the disposable key repository 480. This dynamic key pair may be used, as will be described below, for user authentication to web sites, or other situations where a dynamic key is more appropriate. The cryptographic engine 440 is described in more detail below, with respect to FIGS. 7A-C.

The cryptographic engine 440 is coupled to authentication engine 450, which authenticates the user, prior to performing any cryptographic services. The authentication engine 450 may use any method of identifying the user's biometric data, received through the crypto-proxy interface 410 and comparing the data to data in the user and credential database 485. For one embodiment, the authentication engine 450 is a fingerprint authentication engine, and identifies minutiae in the user's fingerprint, and compares these minutiae with the template stored in the user and credential database 485.

The database engine 470 may further be coupled to a logging engine 465. The logging engine 465 logs activity of users and administration. For one embodiment, this may be useful to determine if someone is attempting to break into the crypto-server 250, and to track usage patterns, and other useful data. For one embodiment, this information is stored in the activity log 495. For one embodiment, the activity log 495 includes individual users' activities, false access activities, and administrative activities.

Figure 5:
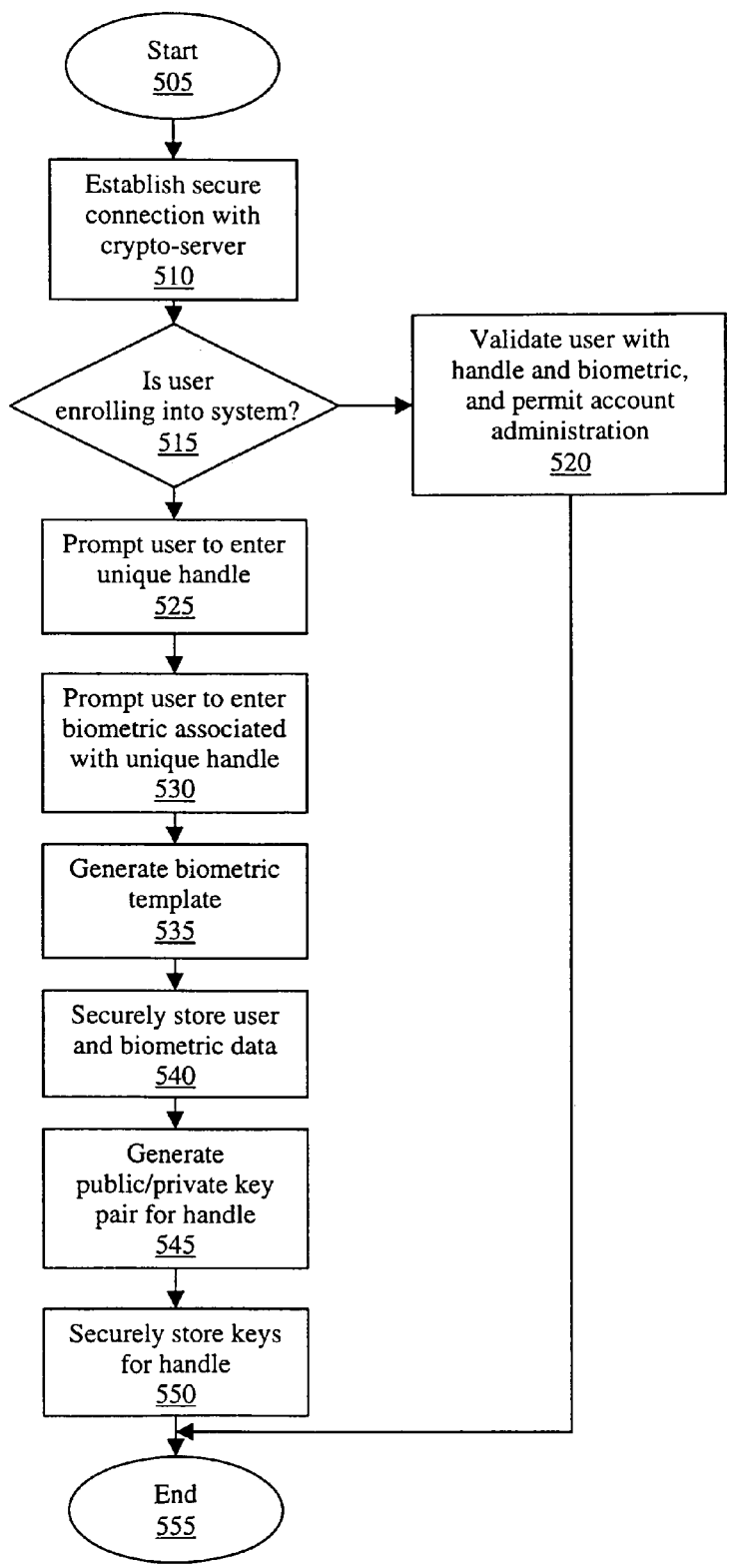
FIG. 5 is a flowchart of one embodiment of an enrollment process.

FIG. 5 is a flowchart of one embodiment of an enrollment process. The process starts at block 505. At block 510, a secure connection is established with the crypto-server. For one embodiment, this secure connection is through the World Wide Web (the web) and is established through using an HTTPS protocol. Alternative methods of establishing a secure connection, including using a known system with personal supervision, may be used.

At block 515, the process determines whether the use is enrolling into the system, or is accessing the system to for maintenance purposes. For one embodiment, the user may select the reason for access at the opening screen, and this decision is made based on the user's response.

If the user is accessing the system for maintenance, the process continues to block 520. At block 520, the user is validated with handle and biometric, and if the user is validated successfully, the user is permitted access to account administration. The process of account administration is well known in the art. For one embodiment, re-validation may be required if the user wishes to add additional biometrics to the database. For one embodiment, if the biometric data is fingerprint data, one finger may be designated as the administrate finger. Thus, the user may have to re-identify himself or herself with the administrative finger, prior to altering biometric data in the database. The process ends at block 555, when the user logs out of the system. For one embodiment, the user may be automatically disconnected after a period of inactivity.

If, at block 515, the user was attempting to enroll into the system, the process continues to block 525. At block 525, the user is prompted to enter a unique handle. For one embodiment, the present system does not need the user's actual identity. Rather, a unique handle, which may or may not be the user's real name, can be used. In this way, the user may be consistently identified to third parties, but the user does not need to give up his or her privacy. For one embodiment, each user is assigned a unique ID. For another embodiment, the ID need not be unique, and the handle in combination with the biometric data is used to determine which user is accessing the system.

At block 530, the user is prompted to enter biometric data associated with the handle. For one embodiment, the user may register multiple biometrics. For one embodiment, the biometrics are fingerprints, and the user may register up to ten different fingers. For another embodiment, the biometrics may be iris scans, palm prints, voice identification, face identification, or another form of biometric identification which associates a particular person with the handle.

At block 535, a biometric template, or multiple templates, are generated from the biometric data received. For one embodiment, for a fingerprint, the biometric template comprises a template of the minutiae of the fingerprint. The generating of such templates for various types of biometric data is known in the art. For another embodiment, this step may be skipped, and the actual biometric data received from the user may be stored in the crypto-server.

At block 540, the user's handle and biometric data are securely stored in a database. For one embodiment, the biometric data is the template generated at step 535. For another embodiment, the biometric data includes the template and the actual image received from the user. For yet another embodiment, only the actual image may be stored.

At block 545, a public/private key pair is generated for the user. The process of generating such key pairs is known in the art. For one embodiment, multiple key pairs may be generated, having different key lengths. For one embodiment, for user's within the United States, a local key may be generated having 128 bits or more, and an export key may be generated, having 40 bits. For another embodiment, keys of a different length of type may be generated.

At block 550, the keys are securely stored and associated with the user's handle. For one embodiment, the only way to access the keys, after they are generated, is by the user providing the user's handle and biometric data. For one embodiment, the public key may also be distributed to outside locations, at which third parties may access the user's public key. This process is known in the art. The registration process ends at block 555. The user can now perform cryptographic functions by using the biometric data and keys stored in the crypto-server.

Figure 6:
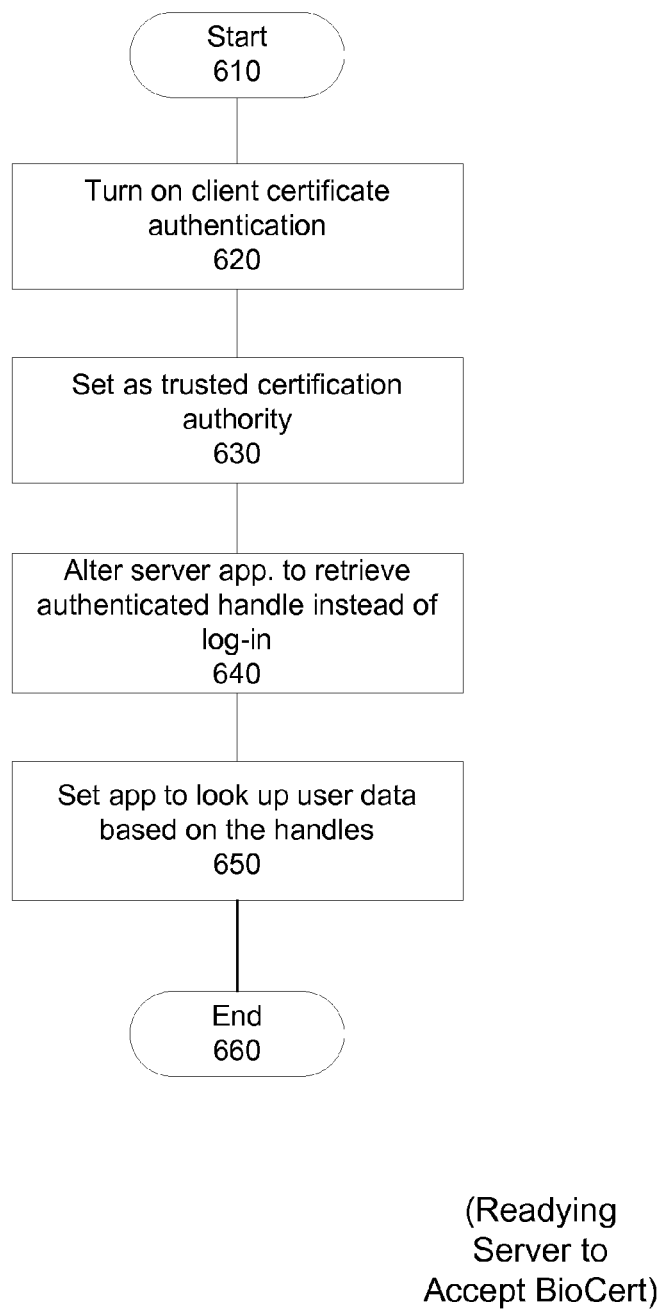
FIG. 6 is a flowchart of one embodiment of readying a server to accept crypto-proxying.

FIG. 6 is a flowchart of one embodiment of readying a server to accept crypto-proxying. A server that wishes to accept certificates from the crypto-server is prepared to accept the crypto-server as a trusted certification server. The process starts at block 610.

At block 620, the client certificate authentication is turned on in the server. Many current servers do not accept client certificates for authentication. If certificate authentication is accepted by the server, this step may be skipped.

At block 630, the crypto-server is set as a trusted certification authority. Generally, certificates are only accepted from authorities that the server has designated as a trusted authority. The crypto-server is set as a trusted authority.

At block 640, the server application is altered to retrieve authenticated handle from user, instead of using a standard log-in process. For one embodiment, the server system may automatically retrieve handle information, based on a cookie or other information. In this way, the user log-in screen may be skipped, and the server may obtain information about the user directly from the user's computer. For one embodiment, this step may be skipped.

At block 650, the server application is set to look up user data based on the user's handle in the crypto-server. In this way, the server can automatically retrieve the user's certified public key from the crypto-server, transparently to the user. The process ends at block 660. After this reading process is completed, if a user enrolled with the crypto-server connects to this server, and authentication is needed, the server automatically authenticates the user, as will be described below.

Figure 7A:
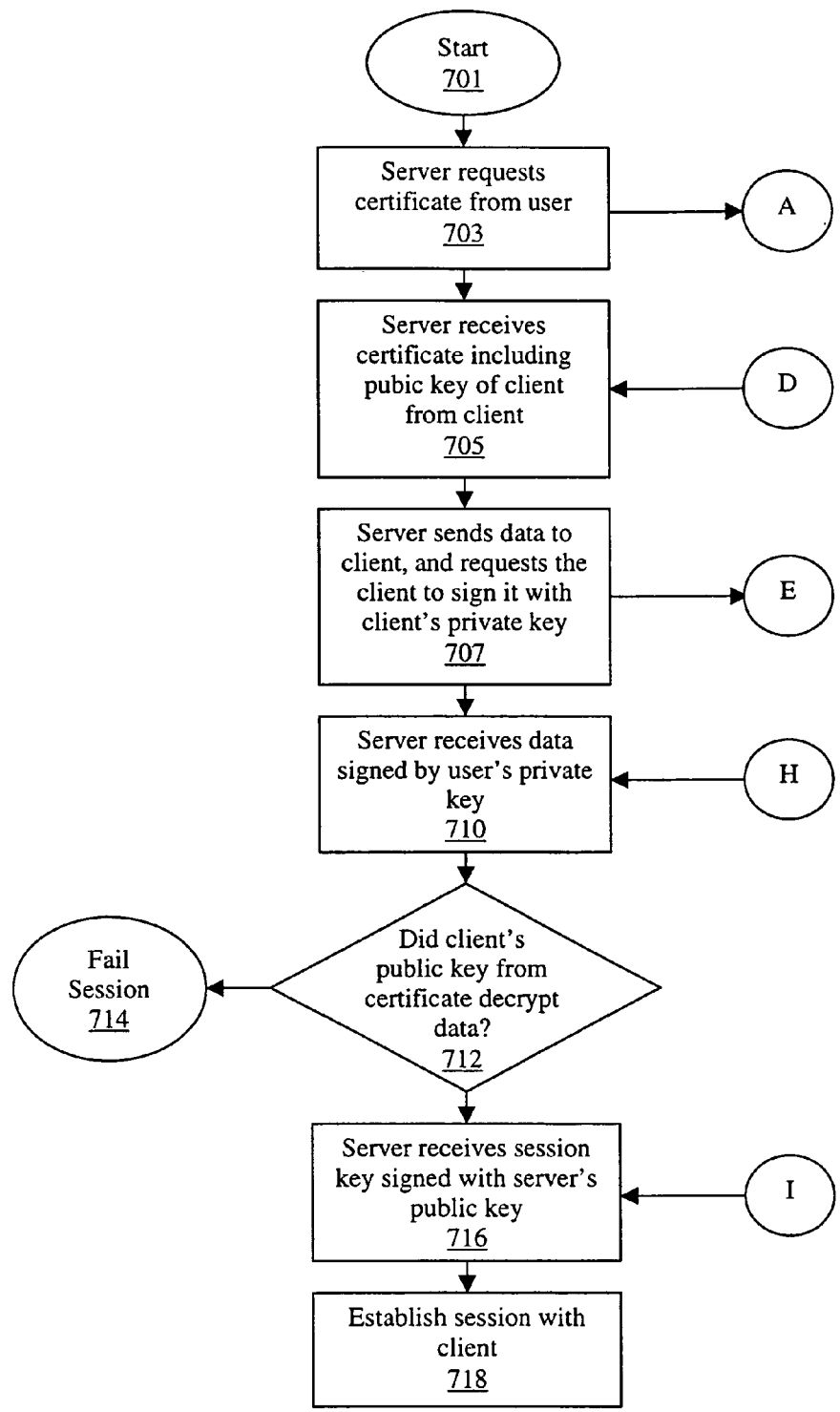
FIGS. 7A-C are a flowchart illustrating one embodiment of using a crypto-proxying service.
Figure 7B:
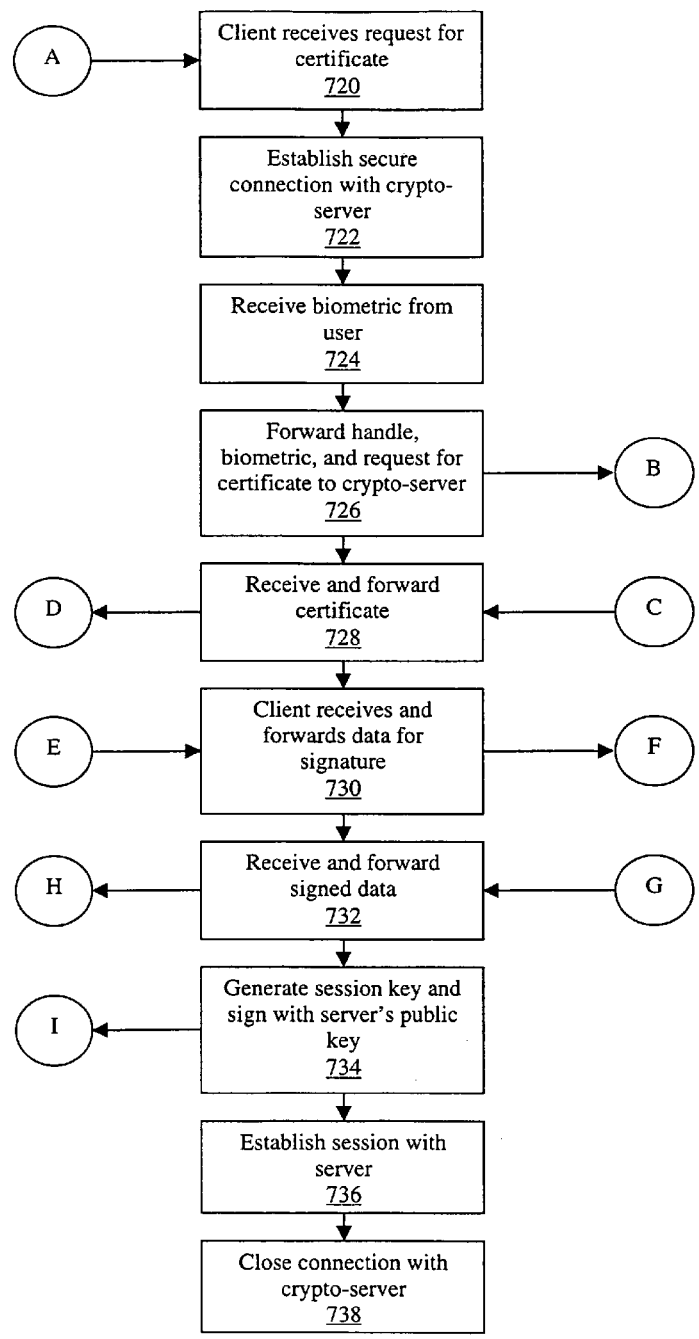
Figure 7C:
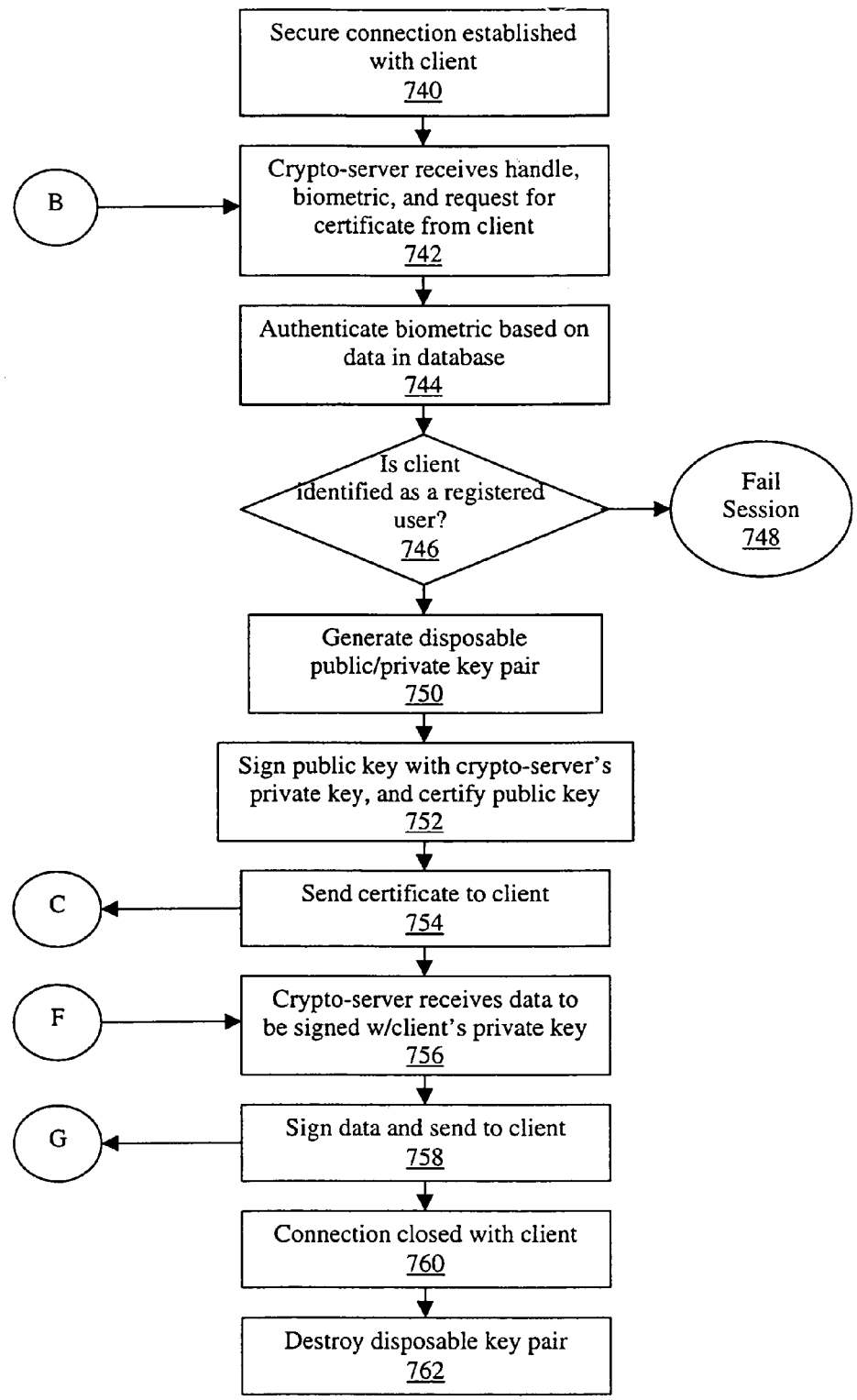

FIGS. 7A-C are flowcharts of one embodiment of using a crypto-proxying service. FIG. 7A shows one embodiment of the server perspective, FIG. 7B the client perspective, and FIG. 7C the crypto-server perspective of the process. The description below follows a logical process, and jumps between the three flowcharts.

The process starts at block 701. At block 703, the server requests a certificate from the user. For one embodiment, this may be in response to the user attempting to as log into a secure area of the server. For example, this may be useful for a user attempting to connect to a bank web site, or another site, where secure communication and secure identification of the other party is useful.

At block 720, the client receives the request for the certificate. At block 722, the client establishes a secure connection with the crypto-server. For one embodiment, this may be a connection using HTTPS, or another secure protocol. This is shown as block 740 in the flowchart illustrating the process from the perspective of the crypto-server.

At block 724, the client receives a biometric from the user. The client requests a biometric to identify the user, and receives the biometric, appropriately secured and potentially encrypted, from a sensor. For one embodiment, the biometric may be a fingerprint of the user. For one embodiment, the sensor may encrypt the fingerprint, or otherwise secure the fingerprint. For one embodiment, this is the only portion of the process in which the user actively participates. The remaining activity is transparent to the user. Thus, the user need not understand the cryptographic process to use this system.

At block 726, the client forwards the handle, fingerprint, and request for the certificate to the crypto-server.

At block 742, the crypto-server receives the data from the client. At block 744, the crypto-server authenticates the biometric data. For one embodiment, the crypto-server compares the biometric data with data regarding the handle that is in the crypto-server's database. For another embodiment, if the crypto-server does not receive handle information, the crypto-server may determine the identity of the user solely based on the biometric. Methods of identifying biometric data are known in the art, when a template or original image is compared to a newly received image.

At block 746, the process determines whether a match was found for the biometric data. If no match was found, the session fails at block 748. For one embodiment, the crypto-server disconnects from the client, and informs the client that the authentication failed. For one embodiment, this may prompt the client the return to block 722, and establish a new secure connection with the crypto-server, to send new biometric data.

If the user was properly identified at block 746, the process continues to block 750. At block 750, a disposable key pair is generated. For one embodiment, the present invention uses general public key/private key pairs, as are known in the art. Alternative types of keys may also be used. The method of generating a key pair is known in the art. For one embodiment, this key pair is stored in a temporary database.

At block 752, the newly generated public key of the user is signed with the crypto-server's private key, and certified. The use of certificates to authenticate public keys received from third parties are known in the art. At block 754, the certificate is sent to the client.

At block 728, the client receives the certificate from the crypto-server and forwards it to the server requesting the certificate.

At block 705, the server receives the certificate including the user's public key from the client. Note that the server knows and trusts the crypto-server, since the server was appropriately enabled. Thus, the server now has a trusted copy of the user's public key.

At block 707, the server sends data to the client, and requests that the client sign it with the client's private key. At block 730, the client receives the data and forwards it to the crypto-server.

At block 756, the crypto-server receives the data to be signed with the client's private key. For one embodiment, this data may include certain date/time related information in an encrypted format, to assure the server requesting the signature that the signature is not a replay of a previously signed data. At block 758, the crypto-server signs the data with the disposable private key generated at step 750, and forwards the signed data to the client.

At block 732, the client receives the signed data and forwards it to the server. For one embodiment, the client merely automatically forwards this information, without accessing the information.

At block 734, the client generates a session key, signs the session key with the server's public key, and forwards the session key to the server. For one embodiment, the server's public key, certified by an accepted certification authority, was sent by the server to the client at a previous stage.

At block 710, the server receives the data signed by the user's private key. The server attempts to decrypt the data using the user's public key received in the certificate.

At block 712, the server determines whether the client's public key was successfully decrypted. If the client's public key was successfully decrypted, the process continues to block 716. Otherwise, the process fails at block 714.

At block 716, the server receives the session key signed by the server's public key. If the server successfully decrypts the session key, i.e. the server is authenticated, a session using the session key is established between the client and the server, at block 718.

At block 738, after a session is successfully established with the server at block 736, the client closes the connection with the crypto-server. At this point, a secure session between the client and the server has been established.

The crypto-server has the connection closed by the client at block 760. The crypto-server then destroys the disposable key pair generated. In this way, a secure connection is established between a client and the server, using the crypto-server for cryptographic functions on behalf of the client. After the session is established, the client is certain that the server is who it claims to be and the server is certain that the client is who it claims to be. This type of high security connections are useful for connections in which money, confidential information, or other high security items are exchanged.

Figure 8:
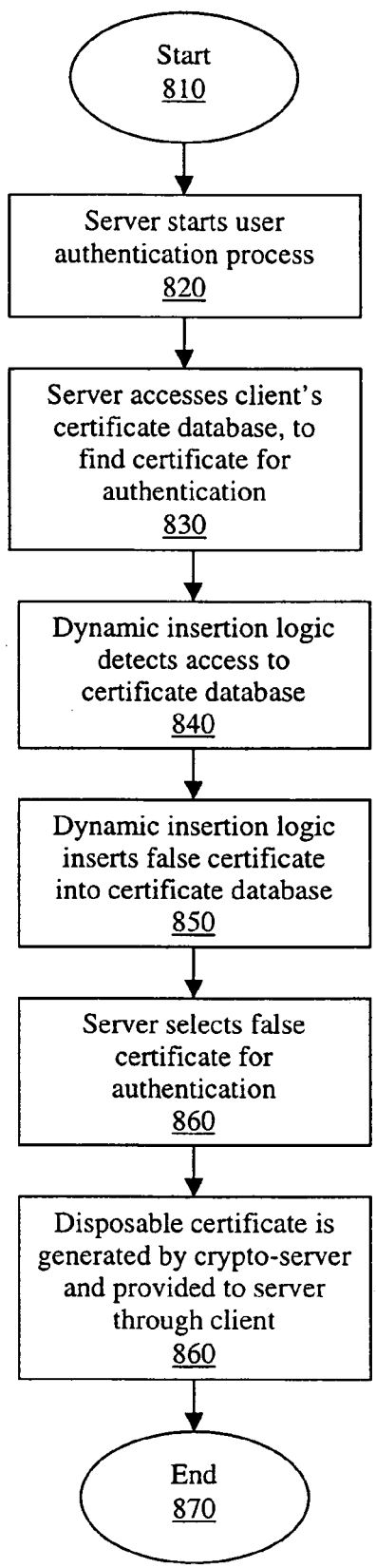
FIG. 8 is a flowchart of one embodiment of using dynamic certification.

FIG. 8 is a flowchart of one embodiment of using dynamic certification. The process starts at bock 810. At block 820, the server starts a user authentication process. As described above with respect to FIG. 7A-C, this process may be used for a variety of sessions that may be established between the server and the client.

At block 830, the server accesses a certificate database in the client system to find a certificate to use for authentication. In certain computer systems, for certain types of authentication, a certificate database is maintained, including at least one certificate that may be used to identify the user. The server would generally attempt to access a certificate from a certification authority which the server considers to be trusted.

At block 840, the dynamic insertion logic of the user's crypto-API detects the access to the certificate database by the server.

At block 850, the dynamic insertion logic inserts a false certificate into the certificate database. The false certificate claims as a certification authority the crypto-server. As discussed above, the server would consider the crypto-server a trusted certification server.

At bock 860, the server selects the false certificate for authentication. For one embodiment, if another certificate is selected, the normal certification process is followed. E.g. the certificate is sent to the server. The server uses the certificate to obtain the user's public key, and then requests a signed data from the user, to authenticate the user. However, in this instance, since dynamic, disposable keys are being used, there is no pre-determined public key, and thus, no real certificate.

At block 870, the disposable certificate is generated by the crypto-server and provided to the server through the client. This process is shown in more detail above with respect to FIGS. 7A-C. In this way, the dynamic insertion logic can permit the use of temporary, disposable keys for systems which obtain their certificates from the certificate database of the user.

Figure 9:
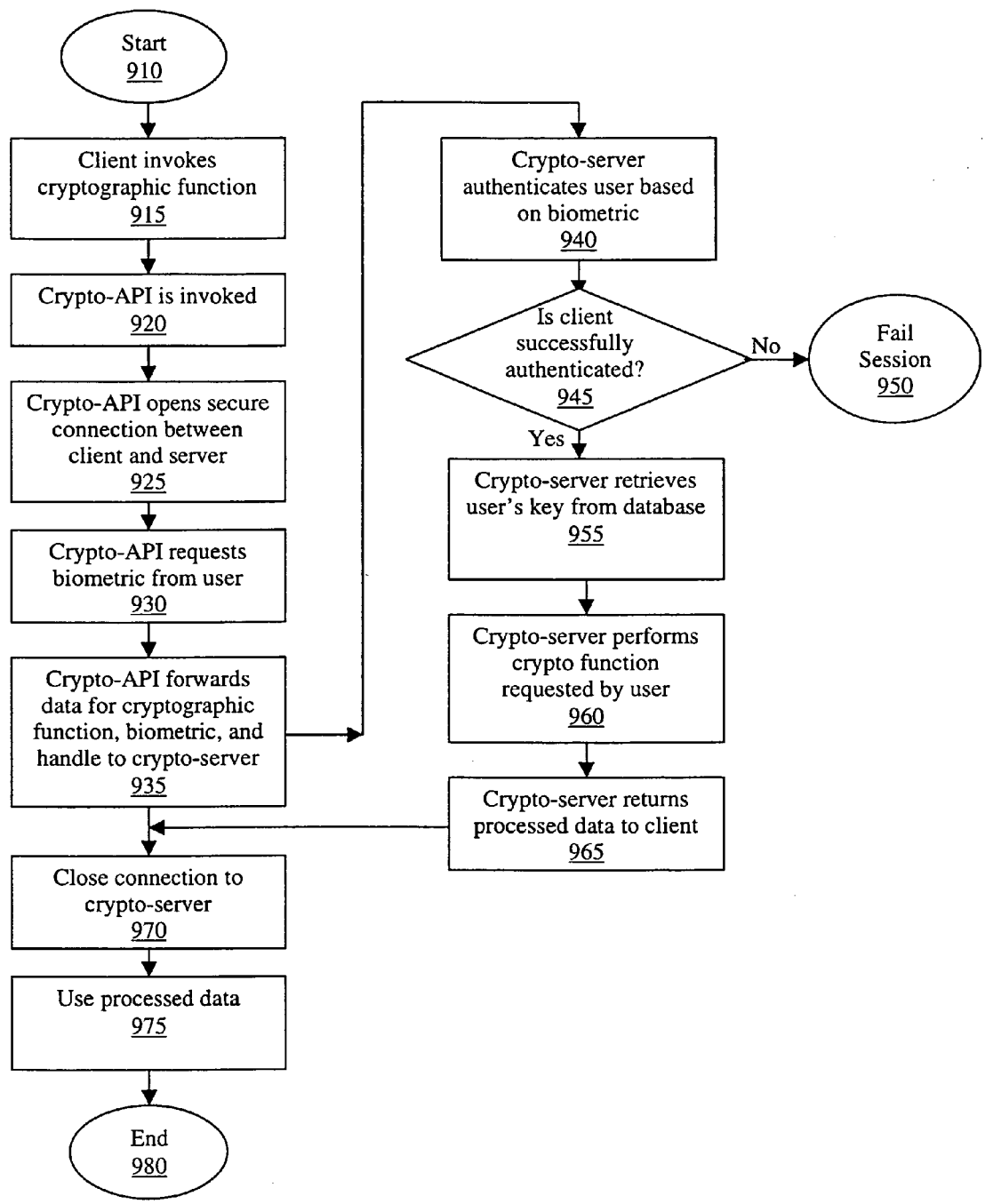
FIG. 9 is a flowchart of one embodiment of invoking a cryptographic function by a user.

FIG. 9 is a flowchart of one embodiment of using the crypto-server to perform a cryptographic function. The cryptographic function may be signing a document using the user's private key, decrypting a document signed with the user's public key, encrypting a document with the user's public key so that only the user can access the document, or other cryptographic functions. At block 910 the process starts.

At block 915, the client invokes a cryptographic function. This may be done deliberately, e.g. by selecting an option such as "sign this document," or automatically, e.g. by sending an email with the signature enabled.

At block 920, the crypto-API is invoked. The crypto-API is invoked when a cryptographic function is called. For one embodiment, the crypto-API, as described above, by default invokes the crypto-server CSP. For another embodiment, the crypto-API may be a free-standing software application that runs cryptographic functions. For simplicity, in this flowchart cryptographic functions are called by the crypto-API. It is to be understood, however, that the crypto-API referenced here is simply an application interface, which interfaces the crypto-server with the user's computer.

At block 925, the crypto-API opens a secure connection between the client and the server.

At block 930, the crypto-API requests a biometric from the user. For one embodiment, this biometric may be a fingerprint. Alternatively, other types of biometric data may be requested from the user.

At block 935, the crypto-API forwards the data for cryptographic function, the biometric received from the user, and the user's handle to the crypto-server. For one embodiment, the user's handle need not be sent.

At block 940, the crypto-server authenticates the user based on the biometric. This process is known in the art. At block 945, the crypto-server determines whether the user was successfully authenticated, i.e. whether the user is a registered user of the crypto-server. If the user was not successfully authenticated, the process continues to block 950, and fails. For one embodiment, an alert may be sent to the user at this point, indicating that authentication has failed, and that the requested cryptographic function was not performed. For another embodiment, the biometric may be re-requested by the crypto-API, to reattempt authentication. For yet another embodiment, the secure connection between the client and the crypto-server may be closed, and the process may end. If the user is successfully authenticated, the process continues to block 955.

At block 955, the crypto-server retrieves the user's keys from the database. The user has a private/public key pair, as described above.

At block 960, the crypto-server performs the cryptographic functions requested by the user. How these functions are performed is known in the art.

At block 965, the crypto-server returns the data to the client. The data is now decrypted, signed, or otherwise processed, as requested by the user.

At block 970, the connection is closed between the client and the crypto-server. The cryptographic process is complete, and the user can use the data at block 975, as he or she desires. In this way, transparently to the user, the system can perform cryptographic functions on data at a remote cryptographic server, without disclosing the user's private key to the user.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of providing remote cryptographic services, the method comprising at a biometric certification server (BCS):
   establishing a secure connection between a client and the biometric certification server (BCS);
   receiving a request for a cryptographic service from the client;
   receiving biometric data from a user;
   the BCS generating a disposable public key/private key pair if the user is authenticated based on the biometric data; and
   the BCS performing the requested cryptographic service.

2. The method of claim 1, wherein the cryptographic service is authenticating the user to an other server.

3. The method of claim 2, further comprising the BCS:
   certifying the public key; and
   forwarding a certificate to the other server.

4. The method of claim 3, further comprising:
   the client receiving data from the other server for signing with a user's private key;
   forwarding the data to the BCS; and
   the BCS signing the data with a user's temporary private key.

5. The method of claim 4, further comprising:
   the client generating a session key for use with the other server, and encrypting the session key with a public key of the other server; and
   the client closing the secure connection between the client and the BCS once the session is established between the client and the other server.

6. The method of claim 2, further comprising:
   detecting an access to a certification database of the client by an other server;
   inserting a temporary certification from the BCS into the certification database of the client; and
   generating a true certificate if the other server chooses the temporary certification.

7. The method of claim 1, wherein the cryptographic service is signing or encrypting data.

8. The method of claim 7, further comprising the BCS:
   retrieving a private key/public key pair for the user; and
   performing the cryptographic service with the private or the public key.

9. The method of claim 1, wherein the client requesting a cryptographic service comprises one of the following: detecting an access to a certificate database of the client, detecting the user attempting to perform a cryptographic activity.

10. A method of providing a certificate from a client to a third party server, the method comprising:
    receiving a request at the client for a certificate from the third party server;
    forwarding the request from the client to a biometric certification server (BCS);
    receiving a biometric identification from the client and forwarding the biometric identification to the BCS;
    if the biometric identification matches a registered user on the BCS, receiving a certificate including a public key of the client certified by the BCS; and
    forwarding the certificate, including the public key of the client certified by the BCS, to the third party server, thereby identifying the client to the third party server.

11. The method of claim 10, further comprising:
    detecting an access to a certification database by the server;
    inserting a temporary certification from the BCS into the certification database; and generating a true certificate if the server chooses the temporary certification.

12. The method of claim 10, further comprising:
the BCS generating a disposable public/private key pair in response to the request; and
the BCS certifying the disposable public key of the user.

13. An apparatus for performing remote cryptographic functions comprising:
a crypto-server having a crypto-proxy interface for receiving a request for a cryptographic function from a client on a secure connection;
an authentication engine for authenticating the user based on biometric data received through the crypto-proxy interface of the crypto-server;
a cryptographic engine for performing the cryptographic functions after the authentication engine has authenticated the user based on the biometric data; and
the crypto-proxy interface for returning data to the client, after the cryptographic functions are performed.

14. The apparatus of claim 13, further comprising:
a database including user credentials;
the authentication engine retrieving user biometric template from the database and comparing the biometric template to the biometric data received from the user.

15. The apparatus of claim 13, further comprising:
a dynamic generation engine for generating a temporary public key/private key pair, the key pair used for establishing a session between the client and an other server.

16. The apparatus of claim 15, further comprising the cryptographic engine generating a certificate including the temporary public key, certified by the crypto-server's private key.

17. The apparatus of claim 15, the dynamic key generation engine destroying the temporary key pair after the session between the client and the other sewer is successfully established.

18. The apparatus of claim 13, further comprising:
user self-registration interface permitting a user to chose a handle and register a biometric template.

19. The apparatus of claim 18, further comprising:
a registration engine for receiving biometric data from the user during a registration process, and further for extracting the biometric template for the user; and
a user credential database for storing the handle and the biometric template of the user.

20. The apparatus of claim 19, further comprising:
the registration engine further for generating a persistent private key/public key pair; and
a database for storing the persistent private key/public key pair.

21. The apparatus of claim 13, further comprising:
a database for storing a persistent private key/public key pair; and
the cryptographic engine for using the persistent private key or public key when appropriate to perform the cryptographic functions.

22. An apparatus for permitting remote cryptographic functions comprising:
a crypto-API (application program interface) for receiving cryptographic function requests;
a cryptographic service provider for establishing a secure connection to a remote crypto-server, and having the crypto-server perform the cryptographic function; and
a sensor for receiving biometric data from a user, the biometric data sent to the crypto-server to authenticate the user, the remote crypto-server to generate a disposable public key/private key pair and perform the requested cryptographic function when the user is successfully authenticated using the biometric data.

23. An apparatus comprising:
a client comprising:
a crypto-API (application program interface) for receiving cryptographic function requests; and
a cryptographic service provider for establishing a secure connection to a remote crypto-server, and having the crypto-server generate a disposable public key/private key pair and perform the cryptographic function;
and a sensor for receiving biometric data from a user, the biometric data sent to the crypto-server to authenticate the user;
the remote crypto-server comprising:
a crypto-proxy interface for receiving a request for the cryptographic function from the client on the secure connection;
an authentication engine for authenticating the user based on the biometric data;
a cryptographic engine for performing the cryptographic functions; and
the crypto-proxy interface for returning data to the client, after the cryptographic functions are performed.

24. An apparatus, comprising:
a crypto-server having a crypto-proxy interface for receiving a request for a cryptographic function from a client on a secure connection;
an authentication engine to authenticate a user of the client based on biometric data of the user;
a cryptographic engine to use a user's private key, as a virtual smart card, to perform the requested cryptographic function after the user has been authenticated by the authentication engine; and
the crypto-proxy interface for returning data to the client, after the cryptographic functions are performed.

25. The apparatus of claim 24, wherein the cryptographic service is authenticating the user to an other server.

26. The apparatus of claim 24, wherein the cryptographic service is signing or encrypting data.

* * * * *